(12) United States Patent
Yamamoto et al.

(10) Patent No.: US 8,699,142 B2
(45) Date of Patent: Apr. 15, 2014

(54) VARIABLE FOCUS LENS

(75) Inventors: Akira Yamamoto, Yokohama (JP);
Masakazu Tohara, Kawasaki (JP);
Minoru Tsuji, Kawasaki (JP); Shoichi Yamazaki, Yokohama (JP)

(73) Assignee: Canon Kabushiki Kaisha (JP)

( * ) Notice: Subject to any disclaimer, the term of this patent is extended or adjusted under 35 U.S.C. 154(b) by 213 days.

(21) Appl. No.: 13/017,811

(22) Filed: Jan. 31, 2011

(65) Prior Publication Data

US 2011/0188127 A1    Aug. 4, 2011

(30) Foreign Application Priority Data

Feb. 3, 2010 (JP) ................................. 2010-022220

(51) Int. Cl.
*G02B 1/06* (2006.01)

(52) U.S. Cl.
USPC .......................................... 359/666; 359/665

(58) Field of Classification Search
USPC ................ 359/665–667; 351/159.04, 159.34, 351/159.68
See application file for complete search history.

(56) References Cited

U.S. PATENT DOCUMENTS

| | | | |
|---|---|---|---|
| 6,369,954 B1 | 4/2002 | Berge et al. | |
| 7,230,771 B2 | 6/2007 | Kuiper et al. | |
| 7,324,287 B1* | 1/2008 | Gollier | 359/666 |
| 7,352,514 B2 | 4/2008 | Hendriks et al. | |
| 7,489,448 B2* | 2/2009 | Hendriks et al. | 359/649 |
| 2004/0228002 A1* | 11/2004 | Schrader | 359/666 |
| 2008/0198438 A1* | 8/2008 | Kuiper et al. | 359/280 |
| 2009/0009880 A1* | 1/2009 | Wu | 359/666 |
| 2009/0185281 A1* | 7/2009 | Hendriks | 359/666 |
| 2010/0110532 A1* | 5/2010 | Takemoto et al. | 359/316 |
| 2010/0309560 A1* | 12/2010 | Dharmatilleke et al. | 359/666 |
| 2012/0176530 A1* | 7/2012 | Zhuang et al. | 348/345 |

FOREIGN PATENT DOCUMENTS

| | | |
|---|---|---|
| DE | 102007004080 A1 | 8/2008 |
| EP | 2 034 338 A1 | 3/2009 |
| JP | 2006-504132 A | 2/2006 |
| JP | 2007-518133 A | 7/2007 |
| JP | 4154858 B2 | 9/2008 |
| WO | 2005096289 A1 | 10/2005 |
| WO | 2007/069213 A2 | 6/2007 |

OTHER PUBLICATIONS

Notification of the First Office Action for corresponding CN 201110030653.0, mail date Jun. 13, 2012. English translation provided.

Stephan Reichelt et al.; Design of spherically corrected, achromatic variable-focus liquid lenses; Optics Express; Oct. 12, 2007, vol. 15, No. 21; pp. 14146-14154.

EESR for corresponding application 10016144.7 dated Apr. 18, 2011.

Communication pursuant to Article 94(3) EPC for corresponding EP 10016144.7. Dated Jul. 9, 3013.

* cited by examiner

*Primary Examiner* — Jordan Schwartz

(74) *Attorney, Agent, or Firm* — Rossi, Kimms & McDowell LLP

(57) ABSTRACT

The variable focus lens of the present invention changes the refractive power by changing each of the shapes of a first interface formed by a first liquid and a second liquid that have refractive indices that differ from each other and a second interface formed by the second liquid and a third liquid that have refractive indices that differ from each other. Thereby, this variable focus lens changes the first interface and the second interface such that the sign of the refractive power of the first interface and the sign of the refractive power of the second interface differ from each other.

2 Claims, 4 Drawing Sheets

VARIABLE FOCUS LENS

BACKGROUND OF THE INVENTION

1. Field of the Invention

The present invention relates to a variable focus lens, and in particular, a variable focus lens that uses a liquid.

2. Description of the Related Art

Conventionally, a variable focus lens is known that can vary its refractive power by controlling the shape of an interface of a liquid by using the electrowetting phenomenon. Here, the variable focus lens disclosed in Japanese Patent No. 4154858 changes refractive power by controlling the shape of an interface of two types of liquid by using the electrowetting phenomenon. In addition, a zoom lens that is disclosed in Japanese Patent Laid-Open No. 2006-504132 carries out zooming by controlling the shape at least at two interfaces. Furthermore, a variable focus lens disclosed in Japanese Patent Laid-Open No. 2007-518133 corrects chromatic aberration by restricting the refractive index and the Abbe number to a certain range in a variable focus lens that changes refractive power by controlling the shape of one interface.

However, in the variable focus lens of Japanese Patent No. 4154858, there is only one interface of the liquid that changes the refractive power, and thus, correcting chromatic aberration is difficult. In addition, the zoom lens in Japanese Patent Laid-Open No. 2006-504132 does not disclose conditions in which the chromatic aberration is corrected when the shapes of a plurality of interfaces are controlled. Furthermore, the variable focus lens of Japanese Patent Laid-Open No. 2007-518133 is a variable focus lens in which the shape of one interface is changed, and thus, in order to correct chromatic aberration, a liquid that satisfies special conditions must be selected, and the range of the selection of liquids is thereby limited.

SUMMARY OF THE INVENTION

Thus, the present invention provides a variable focus lens by which chromatic aberration is advantageously corrected.

An aspect of the present invention is a variable focus lens that enables changing refractive power by changing each of the shapes of a first interface that is formed by a first liquid and a second liquid having refractive indices that differ from each other, and a second interface that is formed by the second liquid and a third liquid having refractive indices that differ from each other wherein the shapes of the first interface and the second interface are each changed such that the sign of the refractive power of the first interface and the sign of the refractive power of the second interface differ from each other According to the present invention, a variable focus lens by which chromatic aberration is advantageously corrected can be provided.

Further features of the present invention will become apparent from the following description of exemplary embodiments with reference to the attached drawings.

DESCRIPTION OF THE EMBODIMENTS

Hereinafter, preferred embodiments of the present invention will now be described with reference to the accompanying drawings.

First Embodiment

Figure 1:
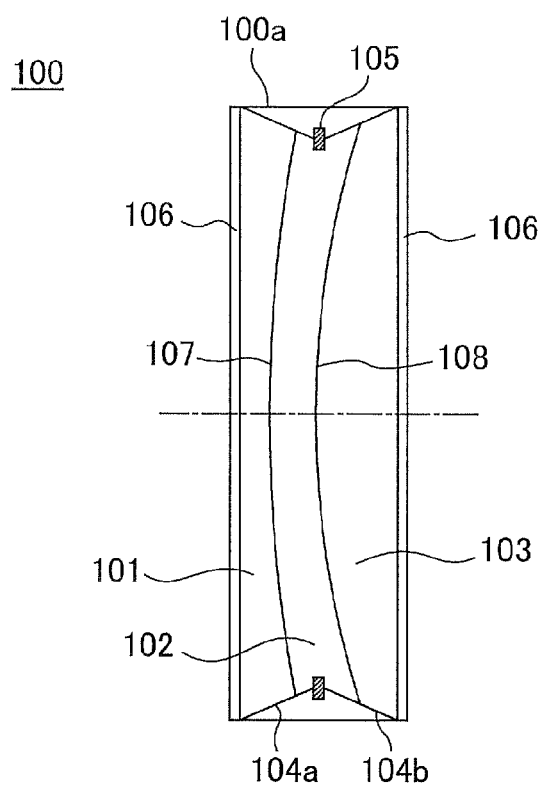
FIG. 1 is a schematic diagram of a variable focus lens according to a first embodiment of the present invention.
Figure 2:
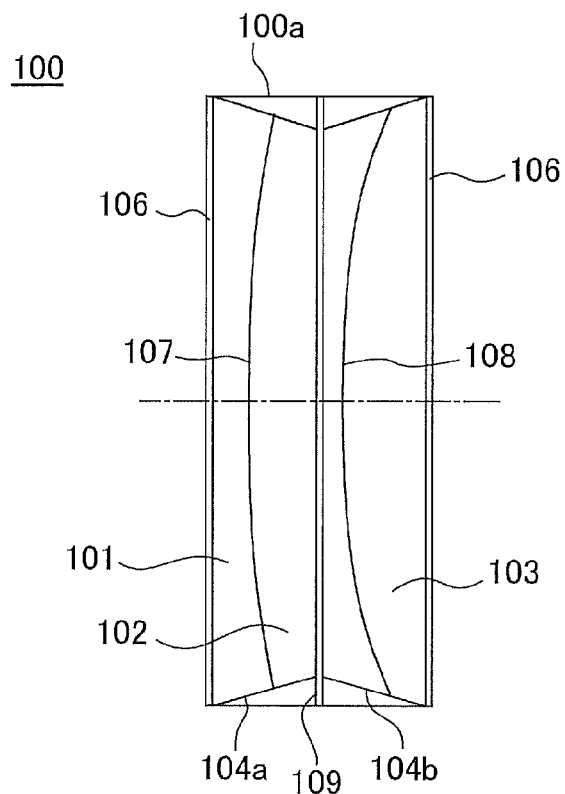
FIG. 2 is a schematic diagram that shows another example of an electrode separating unit according to the first embodiment of the present invention.

First, the structure of the variable focus lens (below, referred to simply as a "liquid lens") that uses a liquid according to a first embodiment of the present invention will be explained. FIG. 1 is a schematic cross-sectional drawing of the liquid lens according to the first embodiment. The liquid lens 100 of the present invention uses three types of liquid, and controls two interfaces that are formed by the three types of liquid by using an electrowetting method. As shown in FIG. 1, the liquid lens 100 includes a substantially cylindrical case 100a, and inside the case 100a, in order from the side to which light is incident, three types of liquid, a first liquid 101, a second liquid 102, and a third liquid 103, are disposed in three layers in an optical axial direction. At the two interfaces respectively formed by the first liquid 101 and the second liquid 102, and the second liquid 102 and the third liquid 103, immiscible substances having different refractive powers are used for the three types of liquid, that is, the first liquid 101, the second liquid 102, and the third liquid 103. For example, water or an electrolytic aqueous solution may be used as the first liquid 101 and oil or the like may be used as the second liquid 102. Below, the interface formed by the first liquid 101 and the second liquid 102 is referred to as the first interface 107 and, in contrast, the interface formed by the second liquid 102 and the third liquid 103 is referred to as the second interface 108. Furthermore, the liquid lens 100 includes electrodes 104a and 104b at two locations, a control unit (not illustrated) that controls the first interface 107 and the second interface 108 by applying a voltage to each of the electrodes 104a and 104b, an electrode separation portion 105, and a cover glass 106. The electrodes 104a and 104b are electrodes for separately controlling the first interface 107 and the second interface 108 based on the voltage supplied from the control unit, and have a conical cylinder shape. Note that in the present embodiment, in order to advantageously control the radius of curvature of each of the interfaces 107 and 108, the shape of the electrodes 104a and 104b is formed such that the electrode 104a and the electrode 104b are inclined toward a relative position, that is, the diameter of the position and the outer peripheral portion are different. However, the shape of the electrodes 104a and 104b may be formed without such an inclination and such that the diameter of the position and the outer peripheral portion are identical. In the liquid lens 100 of the present invention, because electrowetting is used, the electrodes 104a and 104b change the shape of each interface by controlling the contact angle between each of the interfaces and electrodes by using an applied voltage. In addition, the electrode separation portion 105 is disposed at a position relative to electrode 104a and electrode 104b, and formed by an insulating member that enables controlling the voltage of each of the electrodes 104a and 104b independently. Note that as shown in FIG. 2, the electrode separating portion 105 may have a structure in which a transparent plate 109 (for example, a glass plate) is arranged that separates the second liquid 102 into two parts. Cover glasses 106 are glass plates that are disposed at both the light-incident side and the light-emitting side of the liquid lens 100, and seal each of the liquids 101 to 103 inside the liquid lens.

Next, the principle of chromatic aberration correction in the first embodiment of the present invention will be explained. First, for the first through third liquids 101 to 103, the refractive indices of the Fraunhofer C line (656.3 nm) are respectively denoted by $n_{C1}$, $n_{C2}$, and $n_{C2}$, and the refractive indices of the F line (486.1 nm) are respectively denoted by $n_{F1}$, $n_{F2}$, and $n_{F3}$. Similarly, the refractive indices of the d line (589.2 nm) are respectively denoted by $n_{d1}$, $n_{d2}$, and $n_{d3}$. Here, the correction condition for the chromatic aberration is represented in Equation 1.

$$\sum_{n=1}^{n} \frac{\phi_n}{v_n} = 0 \qquad \text{Equation 1}$$

Here, $\phi$ is the optical power of each surface, and $v$ is the Abbe number of each liquid. Note that the optical power is also referred to as "refractive power", and corresponds to the reciprocal of the focal distance. In the present invention, because the surfaces possessing optical power are the two surfaces of the first interface 107 and the second interface 108, Equation 1 is represented as shown in Equation 2.

$$\frac{\phi_1}{v_1} + \frac{\phi_2}{v_2} = 0 \qquad \text{Equation 2}$$

Here, $\phi_1$ denotes the optical power possessed by the first interface 107, and $\phi_2$ denotes the optical power possessed by the second interface 108. To carry out chromatic aberration correction, because 84 >0 to the extent that typical substances are selected as the liquids, the optical power of the two interfaces satisfies the conditions of Equation 2 only in the case of a combination of a liquid having a positive optical power and liquid having a negative optical power.

Next, where the radius of curvature of the first interface 107 is denoted by $R_{12}$, and the radius of curvature of the second interface 108 is denoted $R_{23}$, Equation 2 is transformed to yield Equation 3.

$$\frac{-(n_{F1}-n_{C1})}{R_{12}} + \frac{n_{F2}-n_{C2}}{R_{12}} + \frac{-(n_{F2}-n_{C2})}{R_{23}} + \frac{n_{F3}-n_{C3}}{R_{23}} = 0 \qquad \text{Equation 3}$$

Here, in the first to third liquids 101 to 103, the difference (dispersion) between the refractive indices of the C line and the F line are respectively defined as $\rho 1=n_{F1}-n_{C1}$, $\rho 1=n_{F2}-n_{C2}$, and $\rho 3=n_{F3}-n_{C3}$. In this case, substituting these into Equation 3 yields Equation 4, and rearranging Equation 4 yields in Equation 5.

$$\frac{\rho 2 - \rho 1}{R_{12}} + \frac{\rho 3 - \rho 2}{R_{23}} = 0 \qquad \text{Equation 4}$$

$$\frac{\rho 2 - \rho 1}{R_{12}} = -\frac{\rho 3 - \rho 2}{R_{23}} \qquad \text{Equation 5}$$

This means that Equation 5 represents the achromatic condition for the C line and F line. Here, the term "achromatic condition" denotes that the optical power of the C line and the optical power of the F line match. Specifically, the chromatic aberration can be corrected by satisfying the following conditions:

when $|\rho 2-\rho 1|>|\rho 3-\rho 2|$, then $|R_{12}|>|R_{23}|$
when $|\rho 2-\rho 1|<|\rho 3-\rho 2|$, then $|R_{12}|<|R_{23}|$ The numerical values in TABLE 1, explained below, are applied to this achromatic condition. For example, when $R_{12}$=6.494 mm and $R_{23}$=5.410 mm, the focal distance $f_C$ with respect to the C line, the focal distance $f_d$ with respect to the d line, and the focal distance $f_F$ with respect to the F line are respectively $f_C$=199 mm, $f_d$=200 mm, and $f_F$=199 mm, and thereby the achromatic condition is satisfied. Here, the optical power $\phi_1$ and the optical power $\phi_2$ with respect to the d line are respectively $\phi_1$=0.0222(1/mm) and $\phi_2$=−0.0172 (1/mm), and these have oppositely signed optical powers.

Furthermore, Equation 5 is expanded to yield Equation 6.

$$\frac{R_{12}}{R_{23}} = -\frac{\Delta L_{12}}{\Delta L_{23}} \qquad \text{Equation 6}$$

Here, $\Delta L_{12}=\rho 2-\rho 1$, $\Delta L_{23}=\rho 3-\rho 2$. In this situation, if the liquids used in the liquid lens 100 are decided, the achromatic condition is determined based on their optical characteristics. TABLE 1 is a list that shows each of the refractive indices $n_C$, $n_d$, and $n_F$ and the dispersion $\rho$ for the C line, the d line, and the F line for the first to third liquids 101 to 103. Here, in TABLE 1, assume that the first liquid 101 is water and that the second liquid 102 is silicone oil. In addition, although the third liquid 103 is not specified in particular, the third liquid 103 is assumed to be an aqueous solution in which some substance is mixed with water. Note that in the present embodiment, although the substances of the first to third liquids 101 to 103 are different, a three-layer liquid structure may be formed by a two types of substance.

TABLE 1

|  | $n_c$ | $n_d$ | $n_F$ | $\rho$ |
|---|---|---|---|---|
| LIQUID 101 | 1.3312 | 1.3330 | 1.3372 | 0.00600 |
| LIQUID 102 | 1.4705 | 1.4770 | 1.4835 | 0.01307 |
| LIQUID 103 | 1.3816 | 1.3841 | 1.3888 | 0.00718 |

In addition, TABLE 2 and TABLE 3 are lists that show the changes in the focal distance for liquid lenses overall with respect to the C line, the d line, and the F line in the case in which $R_{12}$ and $R_{23}$ in the conditions described above are each varied at a constant ratio. In TABLE 2 and TABLE 3, $f_d$ is the focal distance of the d line, $f_C$ is the focal distance of the C line, and $f_F$ is the focal distance of the F line. In addition, the unit for each of the radii of curvature $R_{12}$ and $R_{23}$ is millimeters (mm). Furthermore, the lens diameter is 2.5 mm. As shown in TABLE 2 and TABLE 3, when the focal distance of a liquid lens is changed, the chromatic aberration of the F line and the C line can be advantageously corrected if the $R_{12}$ and $R_{23}$ ratio is substantially constant.

TABLE 2

| $f_d$ | $f_C$ | $f_F$ | $\phi_1$ | $\phi_2$ |
|---|---|---|---|---|
| 200.0 | 199.0 | 199.0 | 0.0222 | −0.0172 |
| 300.0 | 298.5 | 298.5 | 0.0148 | −0.0114 |
| 500.0 | 497.5 | 497.5 | 0.0089 | −0.0069 |
| 1000.0 | 995.0 | 995.0 | 0.0044 | −0.0034 |

TABLE 2-continued

| $f_d$ | $f_C$ | $f_F$ | $\phi_1$ | $\phi_2$ |
|---|---|---|---|---|
| −1000.0 | −995.0 | −995.0 | −0.0044 | 0.0034 |
| −500.0 | −497.5 | −497.5 | −0.0089 | 0.0069 |
| −300.0 | −298.5 | −298.5 | −0.0148 | 0.0114 |
| −200.0 | −199.0 | −199.0 | −0.0222 | 0.0172 |

TABLE 3

| $f_d$ | $R_{12}$ | $R_{23}$ | $R_{12}/R_{23}$ | $-\Delta L_{12}/\Delta L_{23}$ |
|---|---|---|---|---|
| 200.0 | 6.494 | 5.410 | 1.200 | 1.200 |
| 300.0 | 9.741 | 8.115 | 1.200 | 1.200 |
| 500.0 | 16.235 | 13.526 | 1.200 | 1.200 |
| 1000.0 | 32.470 | 27.052 | 1.200 | 1.200 |
| −1000.0 | −32.470 | −27.052 | 1.200 | 1.200 |
| −500.0 | −16.235 | −13.526 | 1.200 | 1.200 |
| −300.0 | −9.741 | −8.116 | 1.200 | 1.200 |
| −200.0 | −6.494 | −5.410 | 1.200 | 1.200 |

As explained above, according to the present invention, a variable focus lens by which chromatic aberration is advantageously corrected can be realized.

Second Embodiment

Figure 3:
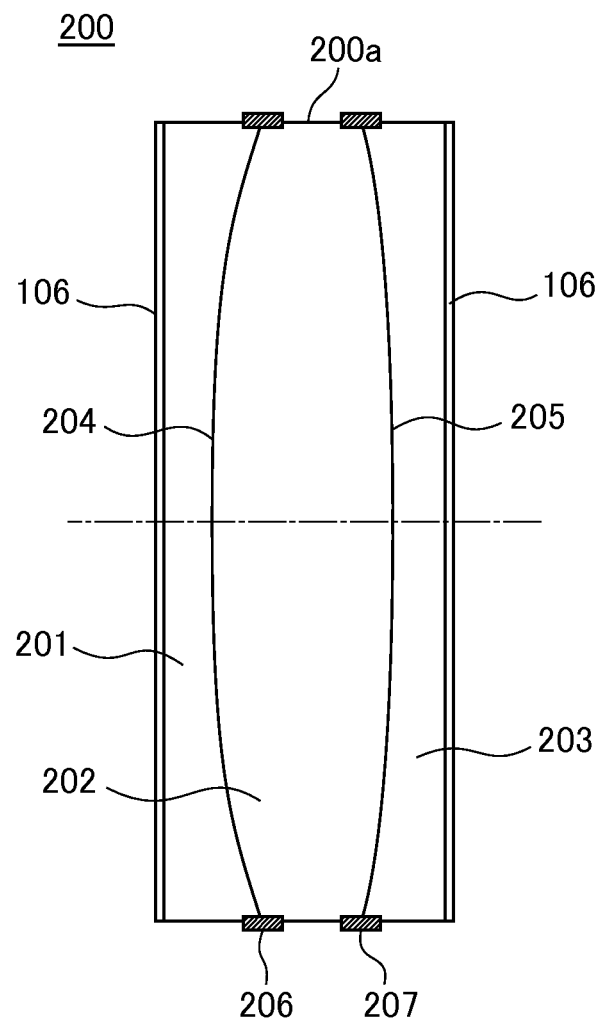
FIG. 3 is a schematic diagram of a variable focus lens according to a second embodiment of the present invention.

Next, a structure of a liquid lens according to a second embodiment of the present invention will be explained. FIG. 3 is a schematic cross-sectional view of a liquid lens according to the second embodiment. Note that in FIG. 3, structures identical to those in FIG. 1 have the same reference numerals appended, and the explanations thereof are omitted. The liquid lens 200 of the present embodiment, similar to that of the first embodiment, controls the two interfaces formed by three types of liquid by an electrowetting method. Furthermore, in the present embodiment, the liquid lens 200 does not electrically control each of the interfaces that is formed by the first to third types of liquid. A first thin film 204 and a second thin film 205 formed of an elastic material are disposed at each interface, and the shape of each surface is mechanically controlled.

The first to third liquids 201 to 203 are different from those in the first embodiment, and thin films are used at the first interface 107 and the second interface 108. Thus, at each of the respective interfaces, immiscible substances are not necessary. Here, TABLE 4 is a list that shows each of the refractive indices $n_C$, $n_d$, and $n_F$ and the dispersion $\rho$ for the C line, the d line, and the F line for the first to third liquids 201 to 203. In addition, in TABLE 4, the first liquid 201 is assumed to be water, and the second liquid 202 is assumed to be silicone oil. In addition, assume the third liquid 203 is organic material having a high refractive index. The first thin film 204 and the second thin film 205 are elastic thin films each formed, for example, by a silicon rubber. Furthermore, the liquid lens 200 is controlled by a control unit. A first drive unit 206 and a second drive unit 207 are provided for respectively driving each of the thin films 204 and 205. Each of these drive units 206 and 207 are disposed so as to be able to move with respect to the case 200a of the liquid lens 200, and the case 200a holds the ends of each of the thin films 204 and 205.

TABLE 4

| | $n_c$ | $n_d$ | $n_F$ | $\rho$ |
|---|---|---|---|---|
| LIQUID 201 | 1.3312 | 1.3330 | 1.3372 | 0.0060 |
| LIQUID 202 | 1.4705 | 1.4770 | 1.4835 | 0.0131 |
| LIQUID 203 | 1.5518 | 1.5617 | 1.5697 | 0.0179 |

Figure 4A:
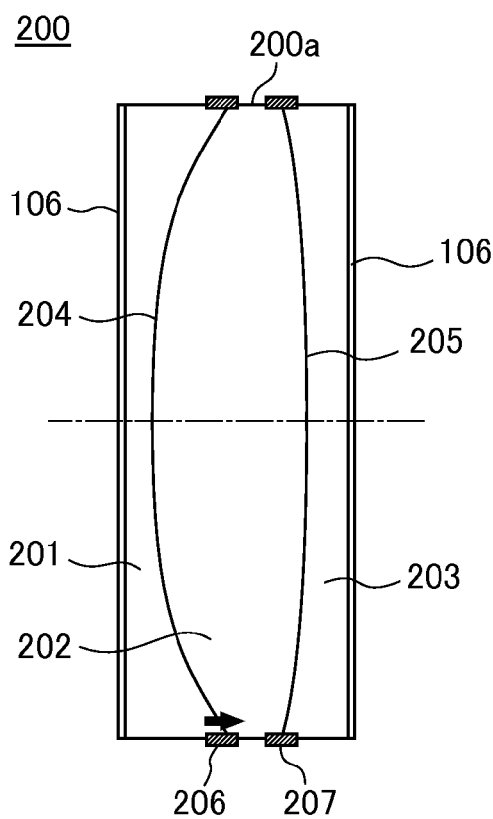
FIG. 4A is a schematic drawing of the variable focus lens when the shape of each interface has been changed.
Figure 4B:
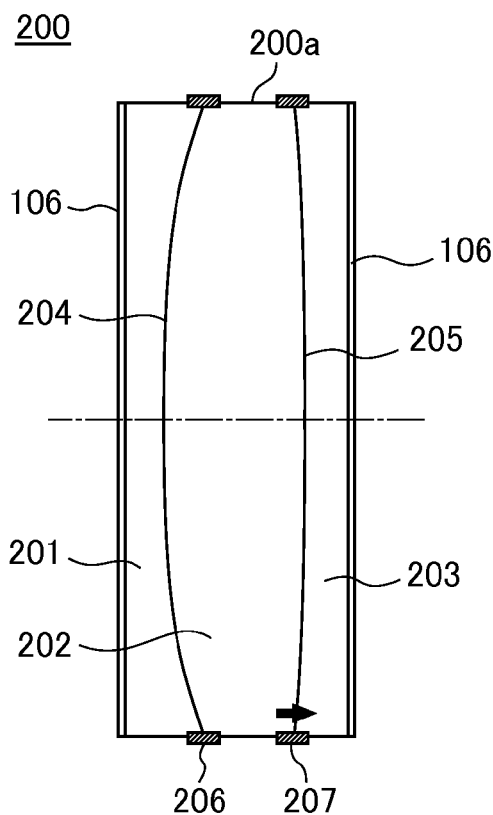
FIG. 4B is a schematic diagram of the variable focus lens when the shape of each interface has been changed.

Next, the operation of each of the thin films 204 and 205 in the present embodiment will be explained. FIG. 4A and FIG. 4B are schematic cross-sectional views that show the liquid lens when the shape of each interface is varied by each of the thin films 204 and 205. First, in FIG. 4A, when the first drive unit 206 moves toward the right of the figure in an optical axial direction, the volume of the first liquid 201 is constant. Thus, the first thin film 204 significantly deforms so as to have a smaller radius of curvature. In contrast, as shown in FIG. 4B, when the second drive unit 207 moves toward the right of the figure in an optically axial direction, the volume of the third liquid is constant. Thus, the second thin film 205 slightly deforms so as to have a larger radius of curvature. That is, due to each of the drive units 206 and 207 moving relative to the case 200a, the shape of the first interface 107 and the second interface 108 can be controlled independently.

Note that in the present embodiment, similar to the first embodiment, only the two thin films 204 and 205 possess optical power. In addition, the thickness of each of the thin films 204 and 205 is ignored, and the thickness component that changes due to each of the thin films 204 and 205 generating an elastic force is also ignored. In this case, when the distance T(mm) between the first thin film 204 and the second thin film 205 is sufficiently small with respect to the radii of curvature $R_{12}$ and $R_{23}$ of each of the interfaces, the influence of the distance T cannot be ignored. In this situation, in the first embodiment, the optical power $\phi$ of the liquid lens 100 overall with respect to the d line was $\phi=\phi_1+\phi_2$ so that the distance T could be ignored. Note that for convenience, the optical power $\phi$ was defined with respect to the d line, but when the wavelength changes, similar equations for other wavelengths (the C line, F line and the like) will be valid. In contrast, in the present embodiment, considering the distance T, the optical power $\phi$ becomes $\phi=\phi_1+\phi_2-\phi_1\times\phi_2\times T/n_{d2}$, where, $n_{d2}$ is the refractive index of the second liquid 202 with respect to the d line. In this case as well, with respect to other wavelengths, the portion of the refractive index may be changed so as to correspond to these wavelengths. Furthermore, in the case in which the range in which the focal point can change is to be made large, the influence of the distance T cannot be ignored because the radius of curvature becomes extremely small. Thus, in the present embodiment, consider the influence of the distance T as shown in Equation 7, which was derived from Equation 6. Note that in Equation 7, when the numerical values lie outside the range of the condition equation, the distance T becomes extremely large in comparison to the radii of curvature $R_{12}$ and $R_{23}$, and the liquid lens 200 cannot readily correct the chromatic aberration.

$$\left(-\frac{\Delta L_{12}}{\Delta L_{23}}\right)\times 0.8 < \frac{R_{12}}{R_{23}} < \left(-\frac{\Delta L_{12}}{\Delta L_{23}}\right)\times 1.2 \quad \text{Equation 7}$$

Here, TABLE 5 and TABLE 6 are lists that show the $R_{12}/R_{23}$ ratio with respect to the $\Delta L_{12}/\Delta L_{23}$ when the focal point distance is changed with respect to the C line and the F line. As shown in TABLE 5 and TABLE 6, by satisfying the conditions of Equation 7, taking into consideration the change in the thickness of the range within which the liquid lens 200 can be formed, the focal distance of the liquid lens can be changed while satisfying the achromatic condition.

TABLE 5

| $f_d$ | $f_C$ | $f_F$ | T | $\phi_1$ | $\phi_2$ |
|---|---|---|---|---|---|
| 200.0 | 198.9 | 198.9 | 1.787 | 0.0463 | −0.0438 |
| 300.0 | 298.4 | 298.4 | 1.624 | 0.0264 | −0.0237 |
| 500.0 | 497.4 | 497.4 | 1.541 | 0.0148 | −0.0130 |
| 1000.0 | 994.9 | 994.9 | 1.488 | 0.0071 | −0.0062 |
| −1000.0 | −995.1 | −995.1 | 1.341 | −0.0068 | 0.0057 |
| −500.0 | −497.6 | −497.6 | 1.249 | −0.0089 | 0.0069 |
| −300.0 | −298.6 | −298.6 | 1.127 | −0.0217 | 0.0180 |
| −200.0 | −199.1 | −199.1 | 0.971 | −0.0320 | 0.0264 |

TABLE 6

| $f_d$ | $R_{12}$ | $R_{23}$ | $R_{12}/R_{23}$ | Ratio |
|---|---|---|---|---|
| 200.0 | 3.107 | −1.933 | −1.608 | 0.905 |
| 300.0 | 5.459 | −3.567 | −1.531 | 0.951 |
| 500.0 | 9.717 | −6.501 | −1.495 | 0.974 |
| 1000.0 | 20.162 | −13.683 | −1.474 | 0.988 |
| −1000.0 | −21.293 | 14.779 | −1.441 | 1.010 |
| −500.0 | −10.855 | 7.599 | −1.429 | 1.019 |
| −300.0 | −6.642 | 4.690 | −1.416 | 1.028 |
| −200.0 | −4.500 | 3.201 | −1.406 | 1.036 |

In this manner, according to the liquid lens of the present embodiment, because the focal distance is changed while satisfying the condition of Equation 7, the chromatic aberration can be more advantageously corrected. In addition, in the liquid lens 200, because each of the liquid interfaces is formed by a thin film, the selection range of the liquids to be used is broadened, such as for the selection of the combination of water and electrolytes and the combination of organic materials.

Third Embodiment

Figure 5:
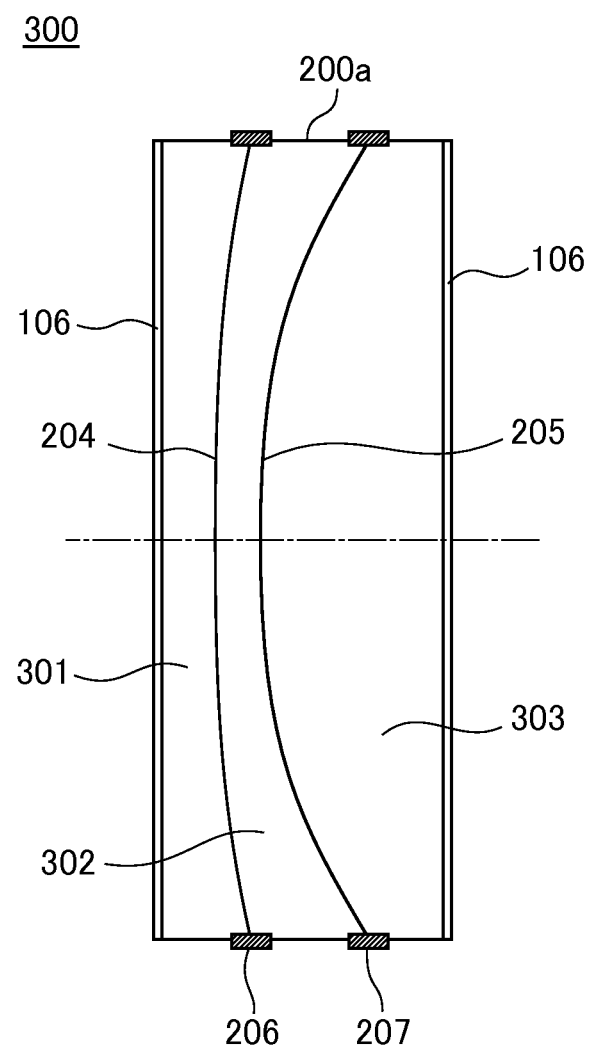
FIG. 5 is a schematic drawing of a variable focus lens according to a third embodiment of the present invention.

Next, a structure of a liquid lens according to a third embodiment of the present invention will be explained. FIG. 5 is a schematic cross-sectional view of a liquid lens according to a third embodiment. Note that in FIG. 5, structures identical to those of FIG. 3 are denoted by identical reference numerals, and the explanations thereof are omitted. In contrast to the structure of the liquid lens 200 of the second embodiment, the liquid lens 300 of the present embodiment uses a liquid having the lowest refractive index for the second liquid 302 in the middle layer of the first to third liquids 301 to 303 that are used.

Generally, in the case in which a liquid lens as disclosed in the present invention is used in a photographic system, the liquid lens is required to have a positive optical power. In contrast, a liquid having a high refractive index has a high dispersion. Taking this situation in to account, as disclosed in the present embodiment, when the liquid having the lowest refractive index is disposed in the middle layer, the middle layer exhibits a significant meniscus shape. As shown in FIG. 5, in the case in which the middle layer has a meniscus structure, the structure becomes one in which the distance T between the first thin film and the second thin film is always smaller than the case in which the both sides of the lens shape of the middle layer have a convex shape, and thus, the middle layer is not readily influenced by the distance T. In contrast, if the specific gravities of the three fluids are completely identical, the interface shape is not influenced by the weight and does not become eccentric. However, actually, specific gravities are rarely completely equal, and the interfaces become eccentric due to the influence of the specific gravity. Thus, the liquid lens 300 of the present embodiment can have be provided with a lens structure that is not readily subject to eccentricity and is weight and acceleration resistant by imparting a meniscus shape to the middle layer.

Here, TABLE 7 is a list that shows each of the refractive indices $n_C$, $n_d$, and $n_F$ and the dispersions ρ of the first to third liquids 301 to 303 in the present embodiment. In TABLE 7, the first liquid 301 is a liquid that has a high refractive index, such as an organic material. Note that the first liquid 301 may be a high refractive index substance in which nanometer-level microparticles are dispersed in water or silicone oil. Furthermore, the second liquid 302 is assumed to be water and the third liquid 303 is assumed to be silicone oil. In addition, TABLE 8 and TABLE 9 are lists that show the $R_{12}/R_{23}$ ratio with respect to $\Delta L_{12}/\Delta L_{23}$ for the case in which these three different types of liquid are used. In TABLE 8 and TABLE 9, the unit for each of the radii of curvature $R_{12}$ and $R_{23}$ is mm, and the lens diameter is 2.5 mm. In the context, in the variable range overall, the ratio changes within the range of TABLE 7, and the focal distances of the C line and the F line are the same, that is, the chromatic aberration correction is normally carried out. In this manner, according to the liquid lens 300 of the present embodiment, the second embodiment can be more favorably implemented.

TABLE 7

| | $n_c$ | $n_d$ | $n_F$ | ρ |
|---|---|---|---|---|
| LIQUID 301 | 1.5402 | 1.5559 | 1.5646 | 0.0244 |
| LIQUID 302 | 1.3312 | 1.3330 | 1.3372 | 0.0060 |
| LIQUID 303 | 1.4705 | 1.4770 | 1.4835 | 0.0131 |

TABLE 8

| $f_d$ | $f_C$ | $f_F$ | T | $\phi_1$ | $\phi_2$ |
|---|---|---|---|---|---|
| 50.0 | 49.48 | 49.48 | 0.942 | −0.00511 | 0.02499 |
| 100.0 | 98.97 | 98.97 | 0.971 | −0.00251 | 0.01249 |
| 200.0 | 197.94 | 197.94 | 0.985 | −0.00125 | 0.00624 |
| 300.0 | 296.92 | 296.92 | 0.990 | −0.00083 | 0.00416 |
| 500.0 | 494.86 | 494.86 | 0.994 | −0.00050 | 0.00250 |
| 1000.0 | 989.73 | 989.73 | 0.997 | −0.00025 | 0.00125 |
| −1000.0 | −989.73 | −989.73 | 1.010 | 0.00025 | −0.00125 |
| −500.0 | −494.87 | −494.87 | 1.019 | 0.00050 | −0.00250 |
| −300.0 | −296.92 | −296.92 | 1.032 | 0.00083 | −0.00416 |
| −200.0 | −197.95 | −197.95 | 1.048 | 0.00124 | −0.00624 |
| −100.0 | −98.98 | −98.98 | 1.096 | 0.00246 | −0.01248 |

TABLE 9

| $f_d$ | $R_{12}$ | $R_{23}$ | $R_{12}/R_{23}$ | Ratio |
|---|---|---|---|---|
| 50.0 | 43.888 | 5.843 | 7.512 | 1.021 |
| 100.0 | 88.681 | 11.689 | 7.587 | 1.011 |
| 200.0 | 178.310 | 23.381 | 7.626 | 1.005 |
| 300.0 | 267.953 | 35.074 | 7.640 | 1.004 |
| 500.0 | 447.231 | 58.459 | 7.650 | 1.002 |
| 1000.0 | 895.445 | 116.922 | 7.658 | 1.001 |
| −1000.0 | −897.434 | −116.930 | 7.675 | 0.999 |
| −500.0 | −449.227 | −58.467 | 7.683 | 0.998 |
| −300.0 | −269.953 | −35.082 | 7.695 | 0.996 |
| −200.0 | −180.325 | −23.389 | 7.710 | 0.994 |
| −100.0 | −90.729 | −11.697 | 7.757 | 0.988 |

Other Embodiments

For example, in the embodiments described above, water is used as a liquid, but the selection of the liquid is not limited thereby. Any liquid may be used in the liquid lens of the present invention provided that a sufficient curvature change can be provided to the liquid interfaces and the liquid has a sufficient transparency at the used wavelength region.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-22220 filed Feb. 3, 2010 which is hereby incorporated by reference herein it its entirety.

What is claimed is:

1. A variable focus lens with a changeable refractive power, the variable focus lens comprising:
   first liquid, second liquid, and third liquid, wherein the first liquid and the second liquid have refractive indices that differ from each other, and wherein the second liquid and the third liquid have refractive indices that differ from each other;
   a first interface defined between the first liquid and the second liquid;
   a second interface defined between the second liquid and the third liquid; and
   a middle layer composed of the second liquid having a meniscus shape between the first interface and the second interface,
   wherein shapes of the first interface and the second interface are each changeable to change the refractive power of the variable focus lens, and so that a sign of the refractive power of the first interface and a sign of the refractive power of the second interface differ from each other,
   wherein the refractive index of the second liquid is the lowest of the refractive indices among the first liquid, the second liquid, and the third liquid,
   wherein for the first liquid, the second liquid, and the third liquid, the refractive indices of the C line are denoted $n_{C1}$, $n_{C2}$, and $n_{C3}$, the refractive indices of the F line are $n_{F1}$, $n_{F2}$, and $n_{F3}$, and the dispersions are respectively $\rho 1 = n_{F1} - n_{C1}$, $\rho 2 = n_{F2} - n_{C2}$, and $\rho 3 = n_{F3} - n_{C3}$, and furthermore, the radius of curvature of the first interface is denoted $R_{12}$ and the radius of curvature of the second interface is denoted $R_{23}$, the following conditions are satisfied:
   when $|\rho 2 - \rho 1| > |\rho 3 - \rho 2|$, then $|R_{12}| > |R_{23}|$; and
   when $|\rho 2 - \rho 1| < |\rho 3 - \rho 2|$, then $|R_{12}| < |R_{23}|$, and
   wherein when the differences in dispersion are respectively $|L_{12} = \rho 2 - \rho 1$, $\Delta L_{23} = \rho 3 - \rho 2$, then the following condition is satisfied:

$(-\Delta L_{12}/\Delta L_{23}) \times 0.8 < R_{12}/R_{23} < (-\Delta L_{12}/\Delta L_{23}) \times 1.2.$ 2. A variable focus lens with a changeable refractive power, the variable focus lens comprising:
   first liquid, second liquid, and third liquid, wherein the first liquid and the second liquid have refractive indices that differ from each other, and wherein the second liquid and the third liquid have refractive indices that differ from each other;
   a first interface defined between the first liquid and the second liquid; and
   a second interface defined between the second liquid and the third liquid;
   wherein shapes of the first interface and the second interface are each changeable to change the refractive power of the variable focus lens, and so that a sign of the refractive power of the first interface and a sign of the refractive power of the second interface differ from each other,
   wherein the refractive index of the second liquid is the lowest of the refractive indices among the first liquid, the second liquid, and the third liquid,
   wherein for the first liquid, the second liquid, and the third liquid, the refractive indices of the C line are denoted $n_{C1}$, $n_{C2}$, and $n_{C3}$, the refractive indices of the F line are $n_{F1}$, $n_{F2}$, and $n_{F3}$, and the dispersions are respectively $\rho 1 = n_{F1} - n_{C1}$, $\rho 2 = n_{F2} - n_{C2}$, and $\rho 3 = n_{F3} - n_{C3}$, and furthermore, the radius of curvature of the first interface is denoted $R_{12}$ and the radius of curvature of the second interface is denoted $R_{23}$, the following conditions are satisfied:
   when $|\rho 2 - \rho 1| > |\rho 3 - \rho 2|$, then $|R_{12}| > |R_{23}|$; and
   when $|\rho 2 - \rho 1| < |\rho 3 - \rho 2|$, then $|R_{12}| < |R_{23}|$, and
   wherein when the differences in dispersion are respectively $\Delta L_{12} = \rho 2 - \rho 1$, $\Delta L_{23} = \rho 3 - \rho 2$, then the following condition is satisfied:

$(-\Delta L_{12}/\Delta L_{23}) \times 0.8 < R_{12}/R_{23} < (-\Delta L_{12}/\Delta L_{23}) \times 1.2.$

* * * * *